United States Patent [19]

Shaffer

[11] Patent Number: 4,717,336

[45] Date of Patent: Jan. 5, 1988

[54] FLASHED-LAMP INDICATOR

[75] Inventor: John W. Shaffer, Montoursville, Pa.

[73] Assignee: GTE Products Corporation, Danvers, Mass.

[21] Appl. No.: 838,987

[22] Filed: Mar. 12, 1986

[51] Int. Cl.⁴ ............................................. F21K 5/02
[52] U.S. Cl. .................................... 431/360; 106/23; 362/5; 431/359
[58] Field of Search .................... 362/5; 431/357, 359, 431/360; 354/127.1; 106/23, 291

[56] References Cited

U.S. PATENT DOCUMENTS

| | | | |
|---|---|---|---|
| 2,876,119 | 3/1959 | Dithmar et al. | 106/23 X |
| 3,311,485 | 3/1967 | Duwell | 106/291 |
| 3,379,674 | 4/1968 | Jakob et al. | 106/291 X |
| 3,586,470 | 6/1971 | Brown et al. | 431/13 |
| 3,609,331 | 9/1971 | Fink et al. | 362/5 |
| 3,718,815 | 2/1973 | McDonough et al. | 362/5 |
| 4,176,389 | 11/1979 | Harvey et al. | 362/5 |

*Primary Examiner*—Samuel Scott
*Assistant Examiner*—Allen J. Flanigan
*Attorney, Agent, or Firm*—Martha Ann Finnegan

[57] ABSTRACT

An improved flashed-lamp indicator composition comprising a volatile dye, a nonvolatile particulate heat-absorbing material; a binding agent; and inert platelet-shaped particles having an average particle size within the range of from about 0.5 to about 1.5 micron is provided. Also provided is a multilamp photoflash array in which each flash lamp of the array has at least one spot of the improved flashed-lamp indicator composition of the present invention in heat-receiving relationship therewith.

13 Claims, 2 Drawing Figures

FLASHED-LAMP INDICATOR

BACKGROUND OF THE INVENTION

This invention relates to multilamp photoflash arrays and more particularly to multilamp photoflash arrays having readily visible means for identifying a flashed lamp.

Flashed-lamp indicators are used in high-voltage photoflash arrays to notify the user when the lamps have been flashed. In multiple lamp array type flash units, such as the Flip Flash and Super 10 arrays, spots of green or blue and heat-shrinkable film have been operatively associated with the lamps and located so as to be visible from the rear of the array. The heat generated by flashing of the lamp causes the film to melt and shrink back out of view exposing a different color to indicate the associated lamp has been flashed.

U.S. Pat. No. 3,609,331 discloses the use of a volatile dye spot on the surface of a flashlamp in a flashcube. The volatile dye spot vaporizes upon flashing of a lamp and condenses on the inside surface of the flashcube cover to define a noticeable colored area thereon. Upon prolonged aging of the product or upon prolonged exposure of the product to temperatures in excess of normal room temperature, the dye in the indicator spot gradually diffuses through the lacquer coating of the flashlamp. This diffusion of the dye causes the lacquer coating on the flashlamp to discolor. Such premature discoloration of the lamp lacquer results in off-color photographs.

SUMMARY OF THE INVENTION

In accordance with the present invention there is provided a flashed-lamp indicator composition comprising a voltalile dye, a nonvolatile particulate heat-absorbing material, a binding agent, and inert platelet-shaped particles having an average particle size within the range of from about 0.5 to about 1.5 micron.

In accordance with another aspect of the present invention there is provided a multilamp photoflash array comprising a base member formed to receive a circuit board, a circuit board with a printed circuit on one surface and affixed to the base member, a plurality of flashlamps in parallel alignment and affixed to the circuit board and a transparent cover member affixed to the base member and enclosing the circuit board and flashlamps therebetween, each flashlamp having a spot of flashed-lamp indicator composition in heat-receiving relationship therewith, said flashed lamp indicator composition comprising a volatile dye, a nonvolatile particulate heat-absorbing material, a binding agent, and inert platelet-shaped particles having an average particle size within the range of from about 0.5 to about 1.5 micron; said dye being volatilized by heat generated by lamp flashing and deposited on the inside face of the transparent cover member to produce a visible colored area on the cover member so as to identify said lamp as having been flashed.

For a better understanding of the present invention, together with other and further objects, advantages, and capabilities thereof, reference is made to the following disclosure and appended claims in connection with the above-described drawings.

DETAILED DESCRIPTION OF THE INVENTION

In accordance with the present invention there is provided an improved flashed-lamp indicator composition. This improved composition of the present invention includes, among other components, fine, platelet-shaped particles or pigments which inhibit migration of the dye component of the composition into the lacquer coating of the flashlamp. The improved flashed-lamp indicator composition of the present invention substantially eliminates the problem of discoloration or staining of the lacquer coating of the flashlamp. As used herein, a pigment is a material that is substantially insoluble in the liquid vehicle used.

Figure 1:
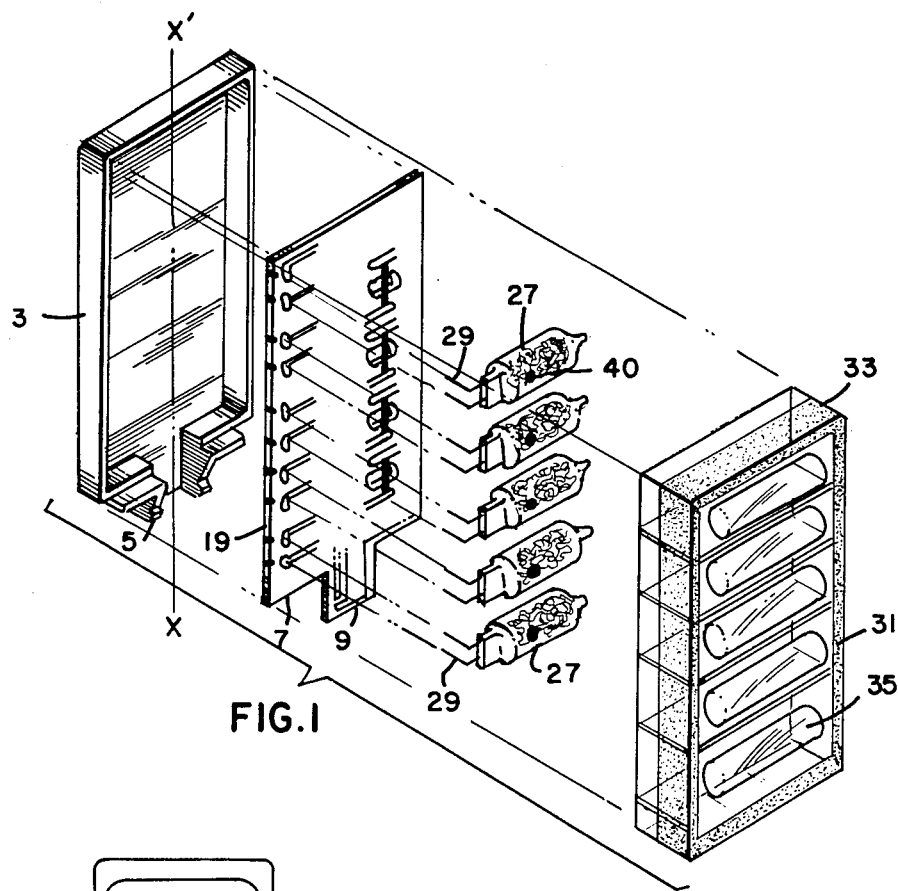
FIG. 1 is an exploded view of an embodiment of a multilamp photoflash array in accordance with the present invention in which no flashed lamps have been flashed.

Referring now to the drawings, FIG. 1 illustrates an exploded view of an embodiment of a multilamp photoflash array of the present invention. Therein, a base member 3 has a longitudinal axis X-X' and an outwardly exending tab portion 5. The base member 3 is recessed and formed to receive a circuit board 7. The circuit board 7 has a longitudinal axis parallel to the longitudinal X-X' of the base member 3. Also, the circuit board 7 has an outwardly extending tab member 9 formed to fit within the tab portion 5 of the base member 3. Positioned on the surface of the circuit board 7 is an electrically conductive printed circuit.

Preferably, the printed circuit includes an electrically conductive common circuit which extends from the tab portion along one edge of the circuit board and in a direction substantially parallel to the longitudinal axis thereof. A plurality of spaced contact pads are aligned along the opposite edge of the circuit board and in a direction substantially parallel to the longitudinal axis thereof. Also, an electrically conductive hot circuit extending from the tab member is formed for connection to a plurality of the contact pads. Attached to the printed circuit are a plurality of radiation-responsive normally-open (N/O) switches and a plurality of radiation-responsive normally-closed (N/C) switches. The normally-open (N/O) switches are formed to provide an electrically conductive path for the hot circuit from one pair of contact pads to the next pair of contact pads upon energization of the N/O switch by energization of a flashlamp. Also, the normally-closed (N/C) switches are formed to connect the electrically conductive common circuit to a contact pad prior to energization of a flashlamp and to disconnect the contact pad from the common circuit upon energization of the flashlamp.

A plurality of flashlamps 27 each having a pair of electrical leads 29 are arrayed for positioning of the electrical leads 29 along the opposite edge 19 of the circuit board 7 and attachment thereof to the contact pads. The flashlamps 27 are mounted in a manner such that each flashlamp 27 extends in a direction normal to the longitudinal axis of the circuit board 7. Thus, the dimension of the circuit board in a direction normal to its longitudinal axis is dependent upon the length of the flashlamps 27. Moreover, the flashlamps 27 are mounted in a manner such that the leads 29 are easily arrayed along the edge 19 of the circuit board 7.

Enclosing the circuit board 7 and the flashlamps 27 is a transparent cover member 31 which is attached to the base member 3. The cover member 31 is preferably fabricated from transparent plastic. The cover member 31 includes a frosted portion 33 and a curved lens 35 for each one of the flashlamps 27. This curved lens serves to direct the light obtained upon energization of each of the associated flashlamps to the subject area being photographed. The cover member may also include at least one prismatic barrier divider extending between a pair of parallel arrayed lamps, as shown in Ser. No. 708,766, filed Mar. 6, 1985 by Shaffer and assigned to the Assignee of the present invention. The array shown in the figure uses no reflectors. In order to prevent distracting backlighting upon flashing of the lamps, it is preferred that the base member be opaque. Preferably, the base member 3 is fabricated from a black, opaque plastic.

Each flashlamp 27 comprises an hermetically sealed light-transmitting envelope within which are disposed a combustible shredded material, a combustion supporting gas, and an ignition means, such as a primer bridge between a pair of leads 29 which are in contact with the primer and which extend from the lamp. The exterior surface of the light-transmitting envelope of each lamp is provided with a reinforcing lacquer film of resin such as cellulose acetate.

Figure 2:
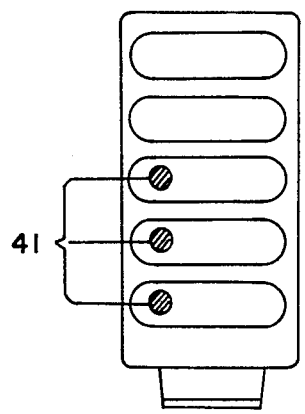
FIG. 2 is a front elevational view of an embodiment a multilamp photoflash array in accordance with the present invention and showing it after three lamps have been flashed.

The embodiment of a flashed lamp indicator illustrated in FIG. 1 of the accompanying drawings comprises a spot 40 of the flashed-lamp indicator composition of the present invention which has been applied to a surface of the lamp. Preferably, the spot is applied to the surface of the envelope at a location which is substantially at or below the middle of the lamp. Most preferably the spot is applied to the surface of the envelope slightly below the middle of the lamp substantially at a location as shown in the figure. When the lamp is flashed, the dye component of the composition volatilizes and deposits on the inside face of the curved lens associated with and adjacent to the flashed lamp to form a noticeable colored area 41 (FIG. 2) which indicates and identifies the lamp as a used one. The flashed-lamp indicator composition of the present invention comprises a volatile dye, a nonvolatile particulate heat-absorbing material, a binding agent, and inert platelet-shaped particles having an average particle size within the range of from about 0.5 to about 1.5 microns. The composition may optionally include a dispersing agent such as sodium (polynaphthalene sulfonate).

Examples of suitable volatile dyes include Dupont Oil Red (an azo dye), Amaplast Red AAP, Amacel Red GG, Organol Vermillion, Amaplast Green OZ, Amacel Yellow G, Amacel Blue BBN, Auramine Base, and Orasol Yellow 3G. The foregoing dyes, which all belong to a class of dyes known as "solvent dyes", are characterized by high vapor pressure at temperatures such as the temperatures attained by a heat absorbing material located on the exterior surface of flashlamps when flashed, i.e., from about 150° C. to 250° C. The color or chemical structure of a dye is not of primary importance for use in the present invention so long as it is sufficiently volatile and chemically stable at lamp-flashing temperature. Red dyes, however, have been found to be particularly well-suited for use in the present invention.

Examples of inert platelet-shaped particles with an average particle size within the range of from about 0.5 to about 1.5 microns suitable for use in the present invention include derivatives of mortmorillonite clay, various other similar clay type products, such as Bentone 27 hydrophobic montmorillonite (made by National Lead Co.), colloidal mica, and pigments such as ASP aluminum silicate pigments (manufactured by MCP Corporation).

The nonvolatile particulate heat-absorbing material component absorbs infrared radiation from the radiant energy of the flash thereby enhancing the transfer of the volatile dye to the associated curved lens of the cover member. Preferably, this material is a pigment. At least half of the heat-absorbing nonvolatile pigment should be a black pigment such as Carbon Black or $Fe_3O_4$. The color of the remainder of the heat-absorbing pigment may optionally be chosen for aesthetic purposes, e.g., so as to make the flashed-lamp indicator spot on an unflashed lamp visibly less conspicuous. See, for example, the following description of a preferred composition wherein a portion of the heat-absorbing nonvolatile pigment is a blue pigment.

The binding agent promotes adhesion of the dried spot to the exterior surface of the lamp. Examples of suitable binding agents include Klucel G. hydroxypropyl cellulose, and partially hydrolyzed polyvinyl alcohol.

Although each of the components of the flashed-lamp indicator composition of the present invention has a functional purpose, the exact percentages in the composition is not critical.

The concentration of binding agent in the composition may be varied from about 5 to about 15 weight percent. The concentration of the nonvolatile particulate heat-absorbing material may be varied from about 2 to about 50 weight percent of the composition. The concentrations of the volatile dye is not critical and may be varied from about 10 to about 60 weight percent of the composition.

The concentration of the platelet-shaped additive may be varied from approximately 5 to 80 weight percent of the overall composition of the spot. The optimum quantity of such platelet-shaped particles varies slightly with the particular additive selected. For example, when Bentone 27 (manufactured by the National Lead Company) is used, the optimum content is about 60 weight percent ±3 weight percent. As the average particle size of the additive increases or decreases compared to that of Bentone 27, the optimum quantity may increase or decrease relative to the optimum quantity found and described for Bentone 27.

An example of a preferred flashed-lamp indicator composition comprises about 25.5±2 weight percent of an easily sublimed dye such as Dupont Oil Red Powder; about 2.6±1 weight percent Carbon Black, a black nonvolatile pigment which increases heat absorption by the spot; about 2.0±1 weight percent Prussian Blue (ferric ferrocyanide) a blue nonvolatile pigment, which also increases heat absorption by the spot, but which makes the indicator spot on an unflashed flashlamp visibly less conspicuous through the cover member of the photoflash array. About 59.7±2 weight percent inert platelet-shaped particles consisting of Bentone 27 (a derivative of montmorillionite clays) made by the National Lead Company; and about 10.2±2 weight percent binding agent consisting of Klucel G, hydroxypropyl cellulose, manufactured by Hercules, Inc.

The flashed-lamp indicator composition of the preferred embodiment is particularly satisfactory for use in a miniaturized multilamp photoflash array. A miniaturized photoflash array typically employs flashlamps having a volume of about 1 cubic centimeter. The sealed envelope of such flashlamps typically have a length dimension of about 2.5 to about 3 centimeter and an outside diameter of about 0.5 to about 0.75 centimeters. In a miniaturized multilamp photoflash array, the indicator spot preferably has length and width dimensions in the range of about 1 to about 3 millimeters.

All of the foregoing weight percentages are based upon the total dry weight of the flashed-lamp indicator composition.

To apply the flashed-lamp indicator spot to the flashlamp, the flashed-lamp indicator composition is stirred into water; the aqueous mixture is applied to the surface of the lamp at the desired location; and the spot is dried on the surface of the lamp. The water content of the mixture may be varied depending upon the desired consistency or viscosity. Preferably, the aqueous mixture contains from about 1 to about 3 parts water to about 1 part flashed-lamp indicator composition.

Accordingly, while there has been shown and described what are at present considered the preferred embodiments of the invention, it will be obvious to those skilled in the art that various changes and modifications may be made therein without departing from the scope of the invention as defined by the appended claims.

What is claimed is:

1. A flashed-lamp indicator composition comprising a volatile dye, a nonvolatile particulate heat-absorbing material, a binding agent, and inert platelet-shaped particles, said particles having an average particle size within the range of from about 0.5 to about 1.5 micron.

2. A flashed-lamp indicator composition comprising from about 10 to about 60 weight percent volatile dye; from about 2 to about 50 weight percent nonvolatile particulate heat-absorbing material; from about 5 to about 15 weight percent binding agent; and from about 5 to about 80 weight percent inert platelet-shaped particles having an average particle size within the range of about 0.5 to about 1.5 micron.

3. A flashed-lamp indicator composition in accordance with claim 2 wherein the volatile dye is a solvent dye which is voltile at lamp flashing temperature.

4. A flashed-lamp indicator composition in accordance with claim 2 wherein the inert platelet-shaped particles having a particle-size in the range of from about 0.5 to about 1.5 micron are selected from the group consisting of colloidal mica, mortmorillonite clay derivatives, and aluminum silicate pigments.

5. A flashed-lamp indicator composition in accordance with claim 2 wherein the nonvolatile particulate heat-absorbing material is a pigment.

6. A flashed-lamp indicator composition in accordance with claim 5 wherein at least about half of the pigment has black color with the balance of the pigment having a color other than black.

7. A flashed-lamp indicator composition comprising about 23.5-27.5 weight percent Oil Red Powder volatile dye; about 1.6-3.6 weight percent black nonvolatile pigment; about 1-3 weight percent blue nonvolatile pigment; about 57.7-61.7 weight percent inert platelet-shaped particles consisting of Bentone 27; and about 8.2-12.2 weight percent hydroxypropyl cellulose.

8. A multilamp photoflash array comprising:
a base member formed to receive a circuit board;
a circuit board with a printed circuit on one surface thereof and affixed to said base member;
a plurality of flashlamps in parallel alignment and affixed to said circuit board; and
a transparent plastic cover member affixed to said base member and enclosing said circuit board and flashlamps therebetween; wherein each of said flashlamps has at least one spot of flashed-lamp indicator composition in heat-receiving relationship therewith, said flashed-lamp indicator composition comprising a volatile dye, a nonvolatile particulate heat-absorbing material, a binding agent, and inert platelet-shaped particles, said particles having an average particle size within the range of from about 0.5 to about 1.5 micron.

9. A multilamp photoflash array comprising:
a base member formed to receive a circuit board
a circuit board with a printed circuit on one surface thereof and affixed to said base member;
a plurality of flashlamps in parallel alignment and affixed to said circuit board; and
a transparent plastic cover member affixed to said base member and enclosing said circuit board flashlamps therebetween; wherein each of said flashlamps has at least one spot of flashed-lamp indicator composition in heat-receiving relationship therewith, said flashed-lamp indicator composition comprising from about 10 to about 60 weight percent volatile dye; from about 2 to about 50 weight percent nonvolatile particulate heat-absorbing material; from about 5 to about 15 weight percent binding agent; and from about 5 to about 80 weight percent inert platelet-shaped particles, said particles having an average particle size within the range of about 0.5 to about 1.5 micron.

10. A multilamp photoflash array in accordance with claim 9 wherein the volatile dye is a solvent dye which is volatile at lamp flashing temperature.

11. A multilamp photoflash array in accordance with claim 9 wherein the inert platelet-shaped particles having a particle-size in the range of from about 0.5 to about 1.5 micron are selected from the group consisting of colloidal mica, mortmorillonite clay derivatives and aluminum silicate pigments.

12. A multilamp photoflash array in accordance with claim 9 wherein the nonvolatile particulate heat-absorbing material is a pigment.

13. A multilamp photoflash array comprising:
a base member formed to receive a circuit board
a circuit board with a printed circuit on one surface thereof and affixed to said base member;
a plurality of flashlamps in parallel alignment and affixed to said circuit board; and
a transparent plastic cover member affixed to said base member and enclosing said circuit board and flashlamps therebetween, wherein each of said flashlamps has at least one spot of flashed-lamp indicator composition in heat-receiving relationship therewith; said flashed-lamp indicator composition comprising about 23.5-27.5 weight percent Oil Red Powder volatile dye; about 1.6-3.6 weight percent black nonvolatile pigment; about 1-3 weight percent blue nonvolatile pigment; about 57.7-61.7 weight percent inert platelet-shaped particles consisting of Bentone 27; and about 8.2-12.2 weight percent hydroxypropyl cellulose.

* * * * *